United States Patent
Mori et al.

(10) Patent No.: US 9,553,966 B2
(45) Date of Patent: Jan. 24, 2017

(54) METHOD AND APPARATUS PERTAINING TO THE DYNAMIC HANDLING OF INCOMING CALLS

(75) Inventors: Robert Felice Mori, Palo Alto, CA (US); Philip Gabriel Yurkonis, Campbell, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 800 days.

(21) Appl. No.: 13/405,822

(22) Filed: Feb. 27, 2012

(65) Prior Publication Data
US 2013/0225230 A1 Aug. 29, 2013

(51) Int. Cl.
*H04M 1/60* (2006.01)
*H04M 1/64* (2006.01)
*H04M 1/65* (2006.01)
*H04M 1/725* (2006.01)
*H04M 3/436* (2006.01)

(52) U.S. Cl.
CPC ........... *H04M 1/6075* (2013.01); *H04M 1/64* (2013.01); *H04M 1/65* (2013.01); *H04M 1/72577* (2013.01); *H04M 3/4365* (2013.01)

(58) Field of Classification Search
USPC ................................................. 379/207.02
See application file for complete search history.

(56) References Cited

U.S. PATENT DOCUMENTS

| | | |
|---|---|---|
| 2002/0151297 A1 | 10/2002 | Remboski et al. |
| 2004/0252027 A1 | 12/2004 | Torkkola et al. |
| 2007/0275697 A1 | 11/2007 | Aminzadeh |
| 2010/0128863 A1* | 5/2010 | Krum et al. ............. 379/207.02 |
| 2011/0269441 A1 | 11/2011 | Silver |

FOREIGN PATENT DOCUMENTS

| | | |
|---|---|---|
| EP | 1467543 A2 | 10/2004 |
| EP | 2099203 A1 | 9/2009 |

OTHER PUBLICATIONS

Extended European Search Report from related European Patent Application No. 13157046.7 dated Jun. 21, 2013; 9 pages.
Canadian Office Action from related Canadian Patent Application No. 2,807,720 dated Nov. 20, 2014; 3 pages.

* cited by examiner

*Primary Examiner* — Junpeng Chen
(74) *Attorney, Agent, or Firm* — Thomas S. Grzesik; Fleit Gibbons Gutman Bongini & Bianco P.L.

(57) ABSTRACT

A control circuit determines when a user of a corresponding portable communication device is presently driving a vehicle and then, in response to detecting this use state, automatically answer incoming calls and provide at least two contact options to the caller. One of these contact options can comprise the option to speak with the user during this call. Another of these contact options can comprise recording a voice message for the user and discontinuing the incoming call without the caller speaking with the user. The control circuit can determine whether the user is presently driving a vehicle by relying upon a direct acknowledgement of the user and/or by indirect means.

15 Claims, 3 Drawing Sheets

METHOD AND APPARATUS PERTAINING TO THE DYNAMIC HANDLING OF INCOMING CALLS

FIELD OF TECHNOLOGY

The present disclosure relates to portable electronic devices and in particular to portable wireless two-way communications devices.

BACKGROUND

Electronic devices, including portable electronic devices, have gained widespread use and may provide a variety of functions including, for example, telephonic, electronic messaging and other personal information manager (PIM) application functions. Portable electronic devices include portable wireless communication devices including several types of mobile stations such as simple cellular telephones, so-called smart telephones, wireless personal digital assistants (PDAs), and laptop computers with wireless 802.11 or Bluetooth capabilities.

Many portable communications devices are capable of receiving an incoming call. The device typically announces the incoming call using one or more of an audible alert, a visual alert, a haptic alert, and so forth. The user can typically answer the call by pressing a button or taking some other action that instructs the device in these regards. If the user takes no action whatsoever, the corresponding communications infrastructure will typically eventually terminate the connection attempt and sometimes provide the calling party with an opportunity to record a voice message that the called party can listen to later when convenient.

Notwithstanding the considerable ability of many persons to successfully multitask their activities, the foregoing approaches are not necessarily sufficient to meet all possible needs of all possible users in all possible application settings.

Improvements in two-way wireless communications devices are desirable.

DETAILED DESCRIPTION

Figure 1:
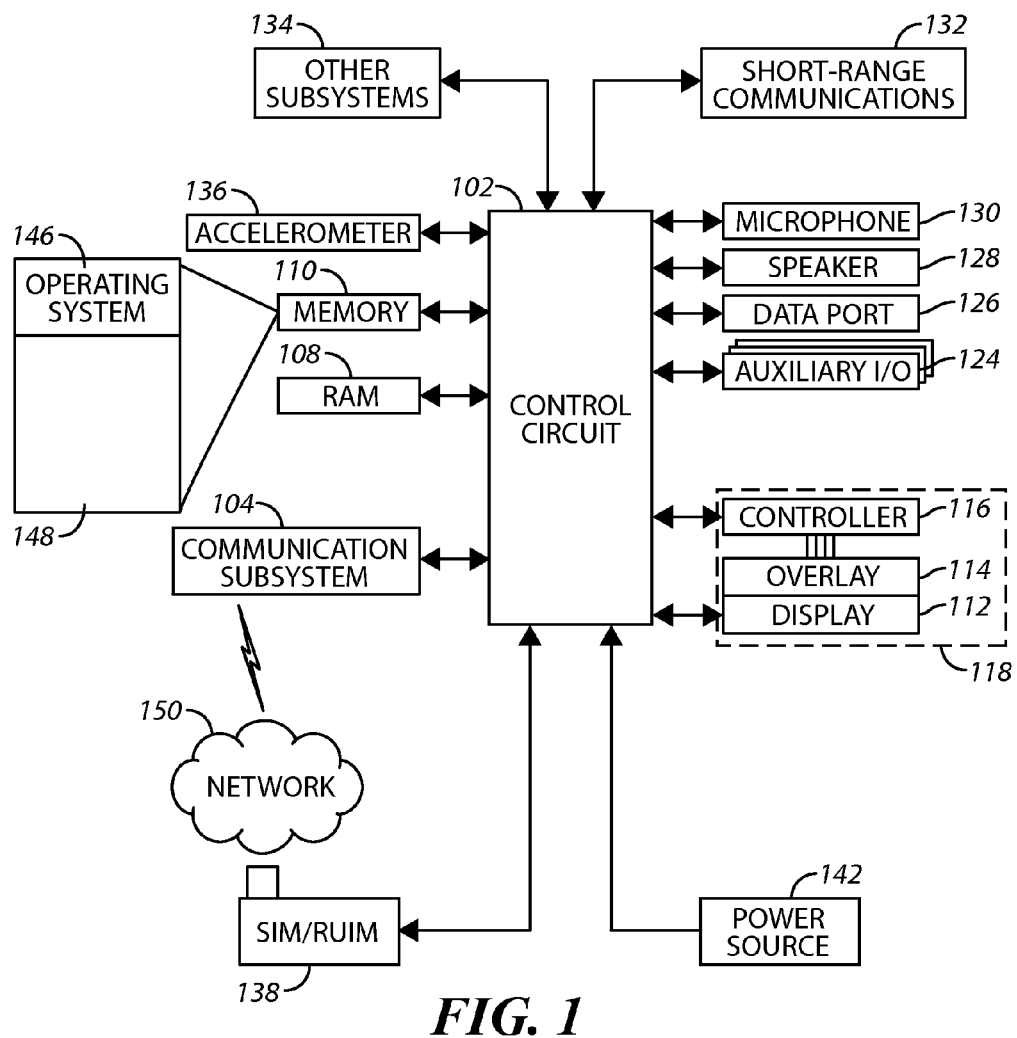
FIG. 1 is a block diagram in accordance with the disclosure.

The following describes an apparatus and method pertaining to a control circuit that determines when a user of the corresponding apparatus is presently driving a vehicle and then, in response to detecting this use state, automatically answers incoming calls and provides at least two contact options to the caller. By one approach, one of these contact options can comprise the option to speak with the user during this call. By another approach, in lieu of the foregoing or in combination therewith, one of these contact options can comprise recording a voice message for the user and discontinuing the incoming call without the caller speaking with the user.

By one approach the control circuit can determine whether the user is presently driving a vehicle by relying upon a direct acknowledgement of the user and/or by indirect means.

So configured, such an approach can result in considerable cognitive offloading for the user while nevertheless providing, for example, the peace of mind that comes with knowing that emergency calls will ring through notwithstanding that most calls are likely to divert automatically to voice mail or some other option. Such an approach may also serve as a basis for reductions in the cost of insurance.

These teachings are highly flexible in practice and will accommodate a wide variety of vehicles and/or driving detection methodologies. These teachings can also be applied to leverage the continued viability and utility of a variety of existing call-answering options.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, an exemplary portable electronic device includes a control circuit 102 (such as a properly programmed processor) that controls the overall operation of the portable electronic device. Communication functions, including data and voice communications, are performed through a communication subsystem 104. The communication subsystem receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device.

The control circuit 102 interacts with other elements, such as a Random Access Memory (RAM) 108, a memory 110, a display 112 with a touch-sensitive overlay 114 operably coupled to an electronic controller 116 that together comprise an optional touch-sensitive display 118 (sometimes referred to herein as a touch-screen display), an auxiliary input/output (I/O) subsystem 124 (which might comprise, for example, a physical keyboard such as a full QWERTY keyboard), a data port 126, a speaker 128, a microphone 130, a short-range communication subsystem 132 (such as, for example, a Bluetooth-based short-range communication subsystem), and other device subsystems 134 of choice.

One or more user interfaces are provided. Input via a graphical user interface is provided via the touch-sensitive overlay 114. The control circuit 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the control circuit 102.

The control circuit 102 may interact with an accelerometer 136 that may be utilized to detect direction of gravitational forces or gravity-induced reaction forces that may be associated, for example, with the physical dynamics of driving a vehicle.

To identify a subscriber for network access, the portable electronic device may utilize a Subscriber Identity Module or a Removable User Identity Module (SIM/RUIM) card 138 for communication with a network, such as the wireless network 150. Alternatively, user identification information may be programmed into the memory 110.

The portable electronic device includes an operating system 146 and software programs, applications, or components 148 that are executed by the control circuit 102 and are typically stored in a persistent, updatable store such as the memory 110. Additional applications or programs may be loaded onto the portable electronic device through the wireless network 150, the auxiliary I/O subsystem 124, the data port 126, the short-range communications subsystem 132 (such as, for example, a Bluetooth-compatible transceiver), or any other suitable subsystem 134 (such as, for example, a global positioning system (GPS) receiver). The memory 110 may comprise a non-transitory storage media that stores executable code that, when executed, causes the control circuit 102 to carry out one or more of the functions or actions described herein.

A received signal such as a text message, an e-mail message, or web page download is processed by the communication subsystem and input to the control circuit 102. The control circuit 102 processes the received signal for output to the display 112 and/or to the auxiliary I/O subsystem 124. A subscriber may generate data items, for example e-mail messages, that may be transmitted over the wireless network 150 through the communication subsystem. For voice communications, the overall operation of the portable electronic device is similar. The speaker 128 outputs audible information converted from electrical signals and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. One or more touches, also known as touch contacts, touch events, or sometimes gestures may be detected by the touch-sensitive display 118. The control circuit 102 may determine attributes of the touch, including a location, direction, and/or extent of a touch. Touch location data may include data for an area of contact or data for a single point of contact, such as a point at or near a center of the area of contact.

Figure 2:
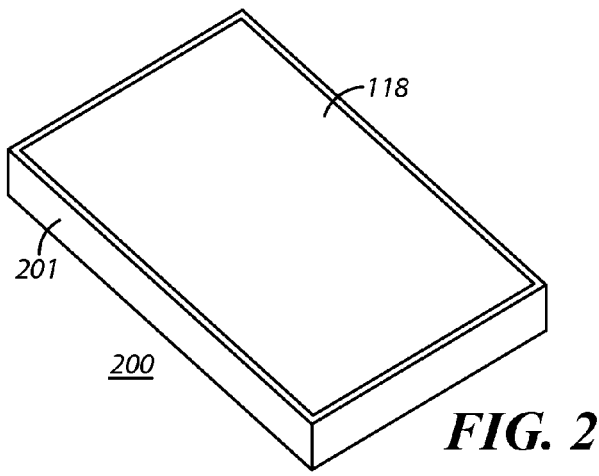
FIG. 2 is a perspective view in accordance with the disclosure.

Referring to FIG. 2, for the sake of illustration but without intending any limitations in these regards, the following description will presume that the portable electronic device comprises a portable two-way wireless communications device 200 such as a so-called smartphone. Such a device 200 often comprises a housing 201 to contain the foregoing components including the touch-screen display 118.

Figure 3:
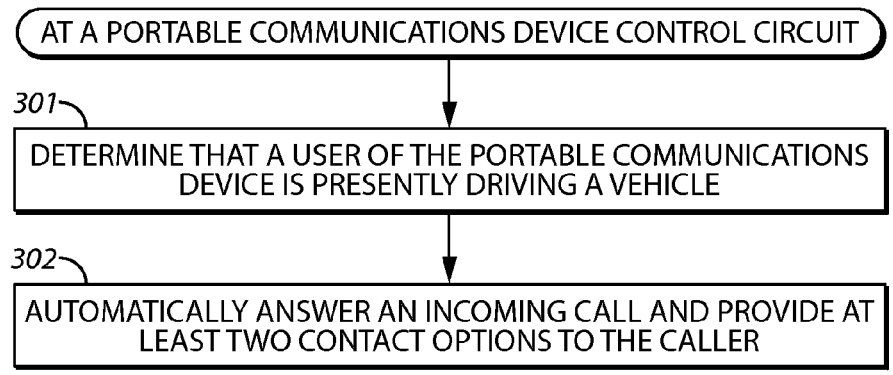
FIG. 3 is a flow diagram in accordance with the disclosure.
Figure 4:
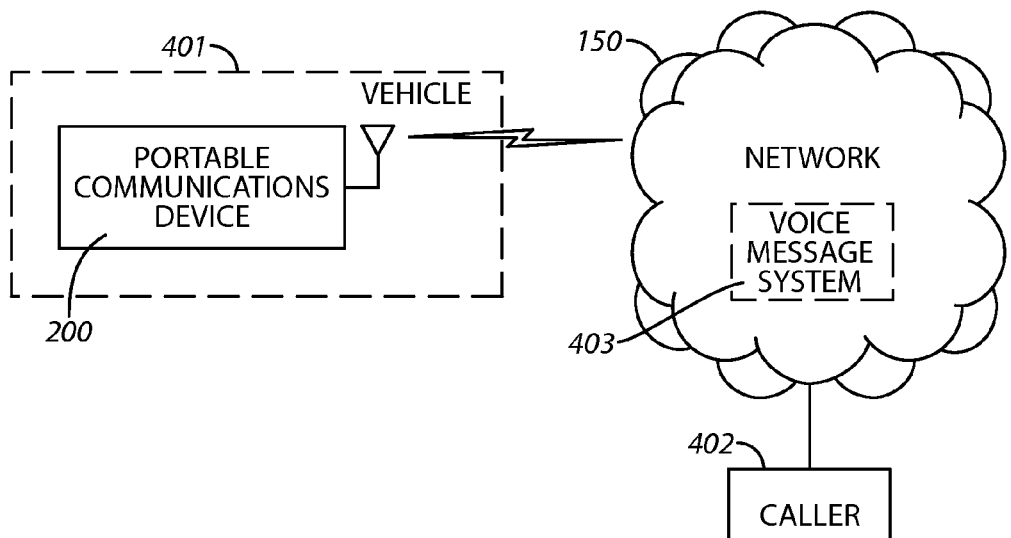
FIG. 4 is a block diagram in accordance with the disclosure.

Referring to FIGS. 3 and 4, the control circuit 102 of the portable communication device 200 is configured to determine 301 that a user of the portable communication device 200 is presently driving a vehicle 401. By one approach this determination is based, at least in part, upon detecting (via, for example, a user interface) a direct acknowledgement from the user in these regards. This might comprise, for example, providing an icon/button on the device's touch-screen display 118 that the user asserts to directly acknowledge the driving user state.

By another approach this determination is based, at least in part, upon indirectly detecting that the user is presently driving a vehicle. Such an indirect determination can be based, for example, upon one or more sensed or received indicators of movement. As one example in these regards, the aforementioned accelerometer 136 can provide data to the control circuit 102 regarding sensed conditions that may correspond to movement of the portable communication device 200 in a vehicle 401.

As another example in these regards, the aforementioned global positioning system receiver 134 can provide data to the control circuit 102 to permit the control circuit 102 to detect movement that is likely attributable to a vehicle.

And as yet another example in these regards, the control circuit 102 can communicate with the vehicle 401 (for example, to an on-board vehicular computer (not shown)) via, for example, the aforementioned short range communications system 132. The control circuit 102 may then be able to glean information such as the speed of the vehicle, the present state of the vehicle's transmission, seat sensor information (indicating, for example, that the driver's seat is occupied), and so forth.

Of course, the disclosed concept will accommodate any number of other driving-detection mechanisms and methodologies. Other examples in these regards include, but are not limited to, cell-phone tower triangulation (to thereby detect motion), leveraged WiFi connections (where location/ movement may be discerned by using information corresponding to the known location of many such networks), detecting that the device has been placed into a vehicle dock (where, for example, the physical and/or electronic coupling occasioned by the docking can serve as a driving indicator), detecting Bluetooth connections between the vehicle and other components such as headphones or the like, detecting a particular near-field communication that serves to signal the interior of a vehicle, and so forth.

It is possible, of course, that even a relatively sophisticated approach to indirectly detecting that the user of the device 200 is presently driving may lead to an inaccurate conclusion. If desired, detecting indicia of driving can serve to automatically provide a prompt to the user (such as a visual, auditory, and/or haptic prompt) to now acknowledge their driving state. By one approach, the control circuit 102 is configured to only determine that the user is, in fact, driving if the user provides a positive affirmation to such a prompt. By another approach the control circuit 102 determines that the user is driving unless the driver affirmatively indicates otherwise. The present teachings will also accommodate a combination of these approaches where, for example, more definitive indicia of driving give rise to an opportunity for the user to indicate that they are not driving while other less-definitive indicia of driving might give rise to an opportunity for the user to acknowledge that they are driving.

When the control circuit 102 does determine that the user is presently driving a vehicle 401, and upon a caller 402 making an incoming call to the portable communication device 200, the control circuit 102 then automatically answers 302 that incoming call and provides two or more contact options to the caller 402. One of these contact options can comprise the option to speak with the user during this call. In this case, for example, the portable communication device 200 alerts the user to the incoming call using an incoming-call alert methodology of choice. The user can then choose to accept the incoming call and speak with the caller 402.

By one approach, this option to speak with the user can be preceded by verbal information provided to the caller 402. This verbal information can comprise stock instructions and/or custom content recorded, for example, by the user or another person on the user's behalf. As one example in these regards, the substantive gist of this verbal information can be that the user is presently driving a vehicle and is not available to converse, but that if this call is an emergency the caller can nevertheless ring through to the user by pressing a specific key or keys (such as "1," "#," "00," and so forth) or by saying a particular verbal command.

These teachings will accommodate considerable flexibility in these regards. For example, in addition to the foregoing, this "speak to the user" contact option could also verbally express the idea that the caller can enter their personally-assigned emergency code at this time to ring through to the user. Using this approach, for example, the user could provide their spouse with a special code (such as, for the sake of illustration, a four-digit personal identification number (PIN) like "7766") for this express purpose.

When combining the latter approach with the foregoing approach for this contact option, it would also be possible to provide different corresponding alerts. For example, an ordinary ringtone could serve when the caller 402 simply indicates that they wish to speak now with the user while a special ringtone could apply when a person with a pre-assigned special code uses that code to express their need to speak now with the user.

Another example of a contact option is to record the caller's voice message for the user and then discontinuing the incoming call without permitting the caller 402 to speak to the user. By one approach this could comprise using an on-board digital recording capability at the portable communication device 200. By another approach, and as illustrated, the intervening network's 150 own voice message system 403 can serve in these regards. Using this approach the user need not be disturbed from their driving as incoming calls lead to the automatic recording of a message per the choice of the caller 402.

Yet another contact option is to permit the caller to select connecting (or attempting to connect) to a different party (such as a subordinate, live-message service, or partner of the originally-called party). Upon selecting this option, for example, the call attempt could be automatically rerouted to the contact address corresponding to the selected option.

These teachings will also readily accommodate other possibilities in these regards. As one example, a contact option might represent a change of contact modality where, for instance, the caller has the option of dictating a message that is automatically transcribed and then emailed or texted to the called party.

Figure 5:
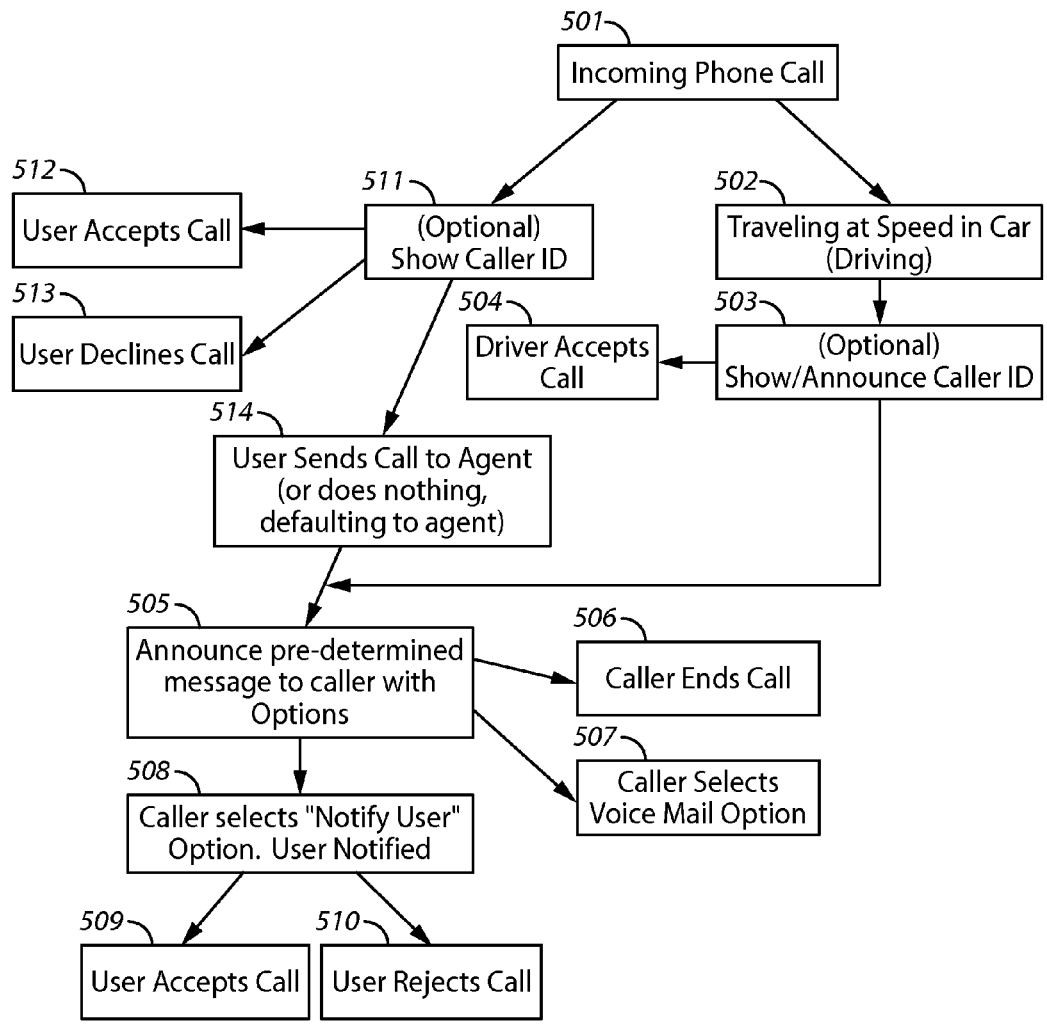
FIG. 5 is a flow/state diagram in accordance with the disclosure.

FIG. 5 provides an illustrative example in these regards. It will be understood that the specifics of this example are intended to serve an illustrative purpose and are not to be taken as suggesting any particular limitations with respect to the practice of these teachings.

In this example, when an incoming phone call 501 occurs, and presuming that the user and their portable communications device are driving 502, these teachings will accommodate providing a caller-identification display 503 to thereby provide an unvetted opportunity for the user to accept the call 504. When this option 503 is not provided (or presuming, for example, a predetermined amount of time passes without the user accepting the call 504), these teachings in this example provide to the calling party a message 505 regarding their available options. This can lead to the caller simply hanging up and ending the call 506, selecting and leaving a voice message 507, or selecting a "notify user" option 508 that causes, for example, a corresponding alert to be provided to the user. The user can then accept 509 the call or reject 510 the call as per their circumstances and their preferences.

This example further illustrates, however, that these teachings can be applied in circumstances other than when driving a vehicle. In particular, the incoming phone call 501 can prompt, if desired, an optional display 511 of caller-ID information to give the called party the opportunity to accept 512 the call or decline 513 the call. In the absence of this option, or presuming that the called party neither accepts nor declines the incoming call, however, this process can continue as described above, beginning with providing an announcement 505 to the calling party about their call-handling options at this time.

So configured, a user can, for example, drive a vehicle and be largely freed from concerns regarding incoming calls. Instead, the user can take comfort in knowing that ordinary phone calls will automatically lead, for example, to an opportunity for the caller to record a message while emergency calls are still able to get through. These teachings are readily applied with a wide variety of existing contact options and can therefore serve to leverage the continued value and utility of those existing contact options.

These teachings are also highly flexible in practice and will accommodate a considerable range of variation and modification. As one example in these regards, the contact list maintained by the portable communication unit 200 may be supplemented with a field to permit the user to designate whether certain contacts are not provided as full a suite of contact options as others. For example, certain contacts may be precluded from choosing to speak now with the user but may have other options presented for their consideration.

As another example in these regards, the user can be provided with an opportunity to mark, flag, or tag the contact information for a given caller who is judged by the user to have abused the opportunity to proceed to speak with the user. This opportunity can be provided, for example, immediately upon the conclusion of the call. Such an indication can then be used as suggested above to deny this caller the speak-now contact option in the future.

And as yet another example in these regards, when the caller selects a "contact now" option, the caller might be required to first record a short verbal message that could then be automatically played for the user (for example, using a speaker-phone capability). The user would then have the option of accepting the call or declining in a more-informed manner.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
    a wireless transceiver;
    a control circuit operably coupled to the wireless transceiver and configured to:
        determine that a user of the apparatus is presently driving a vehicle, at least in part, by detecting direct acknowledgement of driving a vehicle by the user;
        in response to an incoming call from a caller via the wireless transceiver while the user is driving the vehicle, automatically answering the incoming call to provide at least two contact options to the caller.

2. The apparatus of claim 1 wherein at least one of the contact options is to speak with the user during this call.

3. The apparatus of claim 2 wherein at least one of the contact options is to record a voice message for the user.

4. The apparatus of claim 3 wherein the contact option to record a voice message for the user includes discontinuing the incoming call without speaking with the user.

5. The apparatus of claim 1 further comprising:
a user interface that operably couples to the control circuit;
and wherein the control circuit is configured to detect the direct acknowledgment via the user interface.

6. The apparatus of claim 1 wherein the control circuit is configured to determine that the user is presently driving a vehicle, at least in part, by indirectly detecting that the user is presently driving a vehicle.

7. The apparatus of claim 6 wherein the control circuit is configured to indirectly detect that the user is presently driving a vehicle by using data provided by at least one of:
a global positioning system receiver;
at least one accelerometer;
the vehicle.

8. The apparatus of claim 1 wherein the apparatus comprises a portable communications device.

9. A method comprising:
at a control circuit for a portable communications device:
detecting direct acknowledgment of driving a vehicle by a user of the portable communications device;
determining that the user of the portable communications device is presently driving the vehicle, at least in part, by the detecting;
in response to an incoming call from a caller while the user is driving the vehicle, automatically answering the incoming call to provide at least two contact options to the caller.

10. The method of claim 9 wherein at least one of the contact options is to speak with the user during this call.

11. The method of claim 10 wherein at least one of the contact options is to record a voice message for the user.

12. The method of claim 9 wherein determining that the user is presently driving a vehicle comprises, at least in part, indirectly detecting that the user is presently driving a vehicle.

13. The method of claim 9 further comprising:
determining whether a field of a contact associated with the caller in a contact list of the portable communications device indicates the caller is precluded from being provided a speak-now contact option as one of the at least two contact options.

14. A non-transitory computer storage medium having instructions stored therein, which instructions, when executed by a processor, cause the processor to:
detect direct acknowledgement of driving a vehicle by a user of the processor,
determine that the user of the processor is presently driving the vehicle, at least in part, by the detecting;
in response to an incoming call from a caller via the wireless transceiver while the user is driving the vehicle, automatically answering the incoming call to provide at least two contact options to the caller, wherein at least one of the contact options is to speak with the user during this call and another of the contact options is to record a voice message for the user.

15. The apparatus of claim 1 further comprising a contact list including a field that indicates whether individual contacts of the contact list can be provided with a speak-now contact option as one of the at least two contact options in response to receiving an incoming call from the individual contacts of the contact list.

* * * * *